United States Patent

Somervell

[15] 3,665,420

[45] May 23, 1972

[54] COLOR PHOTOGRAPHY FROM CATHODE RAY TUBES AND OTHER RADIATING AREAS

[72] Inventor: James A. Somervell, Chevy Chase, Md.

[73] Assignee: Micromation Systems Inc.

[22] Filed: Oct. 2, 1969

[21] Appl. No.: 863,296

[52] U.S. Cl. ....................................... 340/172.5, 346/110 R

[51] Int. Cl. ....................................... G06f 3/00, G01d 9/42

[58] Field of Search ................. 340/172.5, 173; 346/110, 46; 178/5.2, 5.4, 6.7

[56] References Cited

UNITED STATES PATENTS

| | | | |
|---|---|---|---|
| 2,991,446 | 7/1961 | Loper | 346/46 X |
| 3,161,458 | 12/1964 | Dell et al. | 346/110 |
| 3,287,492 | 11/1966 | Milroy | 178/5.4 |
| 3,303,508 | 2/1967 | Jaffe et al. | 346/110 X |
| 3,395,401 | 7/1968 | Silverman | 340/173 |
| 3,483,565 | 12/1969 | Jaffe et al. | 346/110 X |

*Primary Examiner*—Raulfe B. Zache
*Attorney*—Stevens, Davis, Miller & Mosher

[57] ABSTRACT

An improvement for data conversion apparatus which transforms magnetic tape into microfilm or which transforms any electrically transmittible code onto film. The improvement comprises an electronic synchronization and a rotating disc color filter insertion unit which, operating on command from special coding on the input media, causes the Cathode Ray Tube of the data display to be synchronized with the moving color filter so that selected portions of the displayed data can be photographed in color.

15 Claims, 3 Drawing Figures

Figure 1:
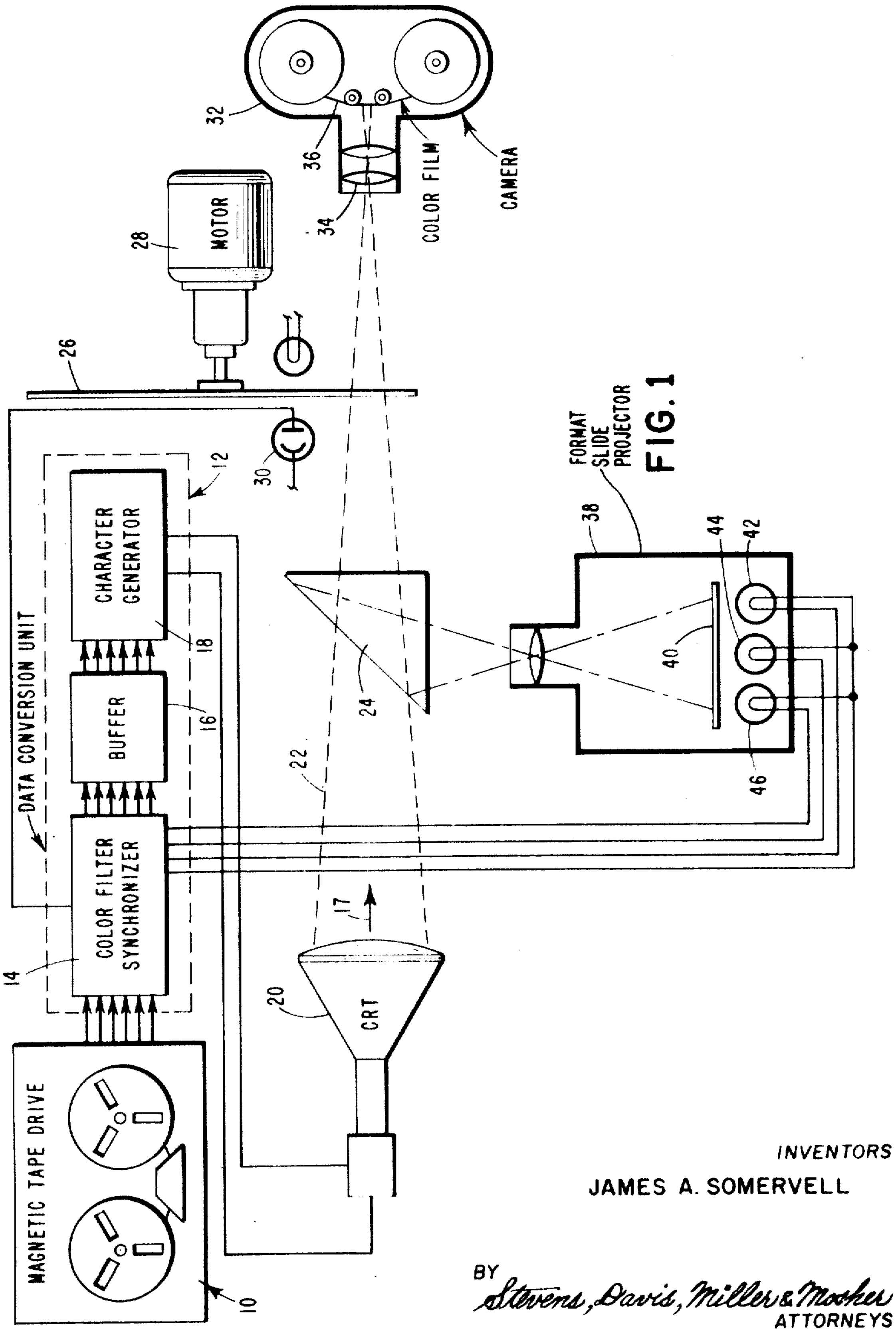

INVENTORS
JAMES A. SOMERVELL

BY
Stevens, Davis, Miller & Mosher
ATTORNEYS

INVENTOR
JAMES A. SOMERVELL

BY Stevens, Davis, Miller & Mosher
ATTORNEYS

COLOR PHOTOGRAPHY FROM CATHODE RAY TUBES AND OTHER RADIATING AREAS

This invention relates to data conversion apparatus and more particularly to an improvement in an apparatus for converting data stored on magnetic tape into the form of data stored on photographic film. A number of devices are well known in the art which are capable of storing large amounts of information such as magnetic tapes, the information being readily readable and convertible to other media such as punch cards or paper tape. However, in order to make this data understandable to human beings it is necessary to convert it into some sort of visual readable form. Such equipment is available on the market today and is commercially known as computer output microfilm equipment — COM. In such equipment, data is stored on a magnetic medium e.g. tape, such tape having a plurality of magnetized areas or "bits," each bit producing a signal to activate a fluorescent spot or area on a cathode ray tube. Using magnetic tape as an example, as the magnetic tape moves through a tape reading unit, the tape is read and a visual image in the form of alpha numeric characters, symbols, and/or graphic messages is produced on the face of the cathode ray tube. This face is conventionally photographed onto black and white microfilm, and such microfilm is then available to be printed-out or viewed in a viewer in order to study the data thereon. Such conventional equipment is disclosed in various U.S. patents, such as U.S. Pat. No. 3,161,458 of Dec. 15, 1964, to H. R. Dell et al., U.S. Pat. No. 3,067,407 of Dec. 4, 1962, to F. W. Schaaf, and U.S. Pat. No. 3,395,401 of July 30, 1968, to Daniel Silverman. The disclosures of each of these patents and the references cited therein are hereby incorporated by reference in order to avoid repetition of background material already known in the prior art.

In such prior art COM equipment the black and white film which is a product thereof is difficult to review and to pick out particular types of data since one of the prime assets of the human eye, the ability to detect difference in color, is not utilized.

To overcome this difficulty in the prior art COM equipment there has been an effort to use a color cathode ray tube which is photographed by color film; for example the color character display of U.S. Pat. No. 3,376,465 of Apr. 2, 1968, to Corpew. The principal difficulties with such devices has been poor resolution and high costs as well as lack of flexibility in the choice of colors.

It is also known in the prior art to use linear moving color filter insertion units operated by electromagnets which receive a command from the tape unit.

A principal object of the present invention is to provide COM equipment which utilizes a single color phosphor cathode ray tube of either standard design or modified phosphorescent face, which is capable of reproducing a color microfilm output by means of a rotating colored filter unit.

Another important object of the present invention is to provide improved COM equipment wherein certain characters may be selectively printed in color by means of a rotating color wheel.

Another object of this invention is to provide a COM device which can provide a readily apparent difference in information types so that when a difference in the appearance of information is needed the computer tape will automatically command such action to come into effect.

A further object of this invention is to introduce pleasing color conditions to persons who are continually searching and retrieving information from microfilm readers, so that the psychological fatigue is lessened and important data is more readily observed.

Still another object of this invention is to provide an efficient method which can rapidly produce such color microfilm in a production environment.

Other objects and advantages of this invention will become apparent upon a more detailed review of a preferred embodiment of this invention as illustrated in the accompanying drawings.

In the drawings

Figure 2:
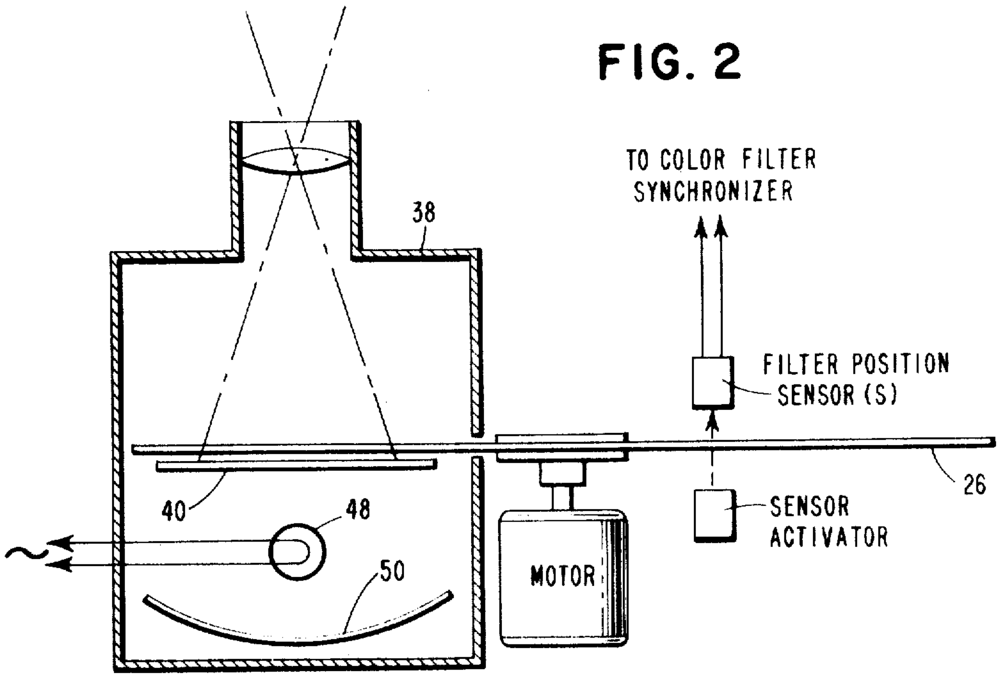
Figure 3:
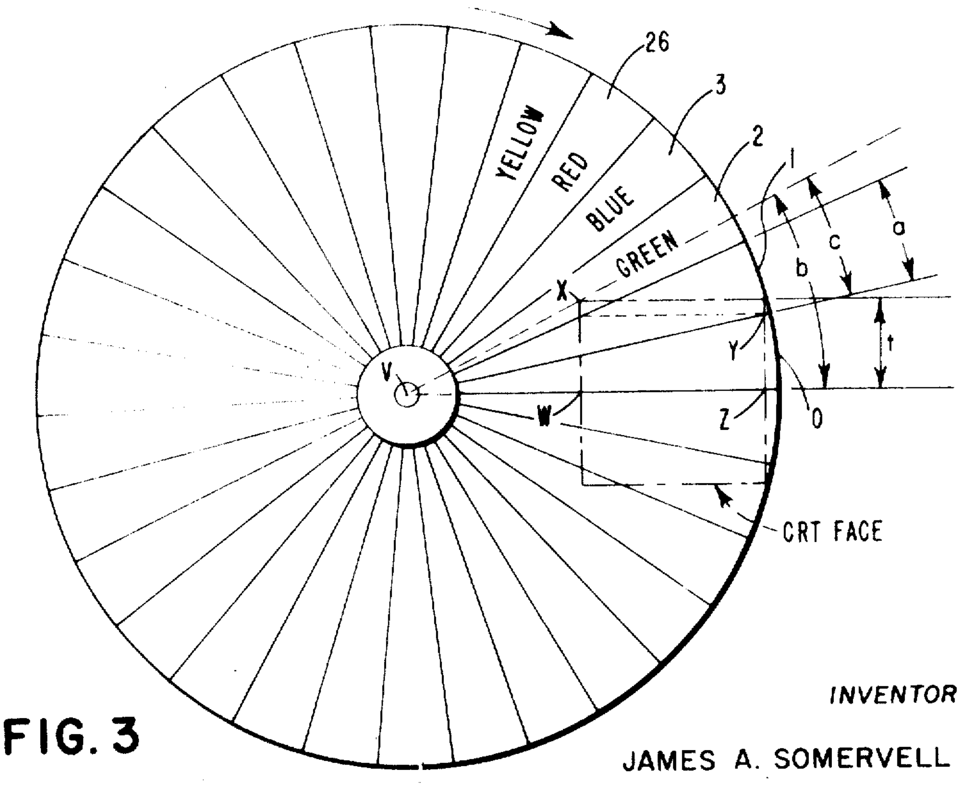

FIG. 1 represents in schematic form a COM device having the improvement of this invention in the form of a rotating color wheel type filter insertion unit, FIG. 2 represents a device for superimposing a preprinted form or other data in black and white or color onto photographic film, and FIG. 3 is a plan view of a segmented rotating color wheel superimposed above a CRT screen.

Referring now to the drawings in greater detail, FIG. 1 shows a tape drive unit and a tape reader 10 upon which specifically programmed magnetic tape is placed and tape signals therefrom are fed into a computer output data conversion unit 12, a single color phosphor cathode ray tube 20, a buffer storage unit 16 and a character generator 18 which is operable to provide the necessary horizontal and vertical deflection signals and intensity blanking to the CRT 20. A lens system 34 and a camera unit 32 is also shown. A shutter may or may not be used depending upon the particular type of equipment that is utilized.

In conventional operation of this equipment a signal on the magnetic tape is fed into the computer output data converter 12 where it causes an image to appear on the screen of the cathode ray tube. (For example, a column of figures from a ledger sheet showing debits and credits thereon.) The image on the CRT screen is then converged by the lens system 34 and reproduced in black and white on the microfilm in the camera unit 32. In such conventional operation there is, of course, little or no opportunity to vary the visible appearance of any particular character on the face of the CRT tube. If a particular emphasis is desired to be given a particular character, it can be marked by a special symbol such as an asterisk, but it is still difficult to read and to visually discriminate on the microfilm due to the monotony of the black and white image thereon.

When the improvement of this invention is used the conventional setup is modified in the following manner: the magnetic tape is programmed with special command codes (bits) which instruct the filter synchronizer 14 to retain or cause to be retained in the buffer storage unit 16 input data which will follow. The filter synchronizer unit receives additional indicative information from the rotating color filter sensor 30 as to the location of a particular filter on the color wheel. As the particular color filter element rotates in front of the CRT, the filter synchronizer unit ascertains whether or not the particular color filter was sensed by the command bits. If it was so specified the filter synchronizer further causes the data stored in the buffer unit to be read out onto the face of the CRT tube. The particular character or data lines thus displayed are then projected through the particular desired color filter segment, through the lens 34 to the camera unit 32 where color film has been substituted for the conventional black and white film. The result is that any particular character, row, or column of characters or totals can be made to appear in a selected color; for example, all credit balances including the credit balance total would be made to appear in green on a ledger sheet. Another example would be to display the hidden lines on an architectural drawing in another color which could be subsequently viewed through filter devices to show the various projections of the drawing singly or as a whole.

For a more detailed explanation of the filter synchronizer unit of this invention reference is now made to FIG. 1 which shows that the tape signals are preferably brought into the filter synchronizer unit 14 where they are stored in the buffer storage 16. Further information is received by the filter synchronizer 14 from the rotating color filter wheel via the position sensor 30. This information is then compared by the filter synchronizer to determine whether the particular color filter specified has rotated in front of the CRT screen or desired part thereof. If the particular filter desired has not as yet rotated in front of the screen the filter synchronizer unit retains the data in storage until the proper time. The rotational delay of the color filter unit is compensated for by the filter synchronizer unit.

Such compensation can be accomplished several ways as is well known in the art. For example the capacity of the buffer storage unit could be increased sufficiently to hold more data than could be displayed immediately. Thus the magnetic tape need not stop or be stopped in reading to wait for the desired color filter to rotate in front of the tube. Another familiar method would be to cause the magnetic tape unit to stop and/or reread to allow the particular color filter desired to rotate in front of the screen. Either of these basic approaches may be accommodated by the filter synchronizer unit.

When the data to be displayed has been synchronized with the proper filter unit the filter synchronizer causes a ray of light to move in the direction shown by arrow 17 and causes the buffer storage to be read out onto the CRT screen 20 and through the color filter 26 and through the lens system 34 to expose a portion of color film. The film may advance in synchronization with the speed of image reproduction on the cathode ray tube 20. Data may be displayed through the CRT rapidly without regard for timing of color filter insertion since the filter insertion unit and input data flow is controlled by the filter synchronizer unit.

Since the color filter wheel is constantly in motion, delay, specifically waiting time, is minimized. There is no inertia to be overcome as there is with devices normally at rest, e.g., solenoid, gravity insertion, and/or "stop start" devices. The color wheel can be rotated at quite rapid speeds which are compatable to present computer devices. For example disc storage devices on present computers have a rotational delay of 30 milliseconds. Even through this device differs in application from that described herein, the illustration is valid to indicate rotational delay times.

Additional rotating filter elements can be inserted in the light path between the CRT face and the camera to produce combinatorial effects upon the color of the light reaching the camera. In addition data may be added or deleted by this method. Additional synchronization circuitry is required in the device in order to produce effects in combination. Adding or deleting information is useful in for example the handling of classified information. Other uses of addition or deletion will be apparent to those skilled in the art.

The filter position sensor is a device which is used in conjunction with the moving filters to provide positive indicative information to the filter synchronizer unit regarding the location of a color filter. This sensor may be incorporated within the rotating filter, be separate from it or may be a combination. The major purpose of the filter position sensor is to indicate when a desired filter segment will be positioned in front of the display area.

The filter position sensor is not required but does provide a positive check on color recording. For example if a color filter wheel is used, a breakdown in the rotation of the wheel is easily detectable by the absence of feed back from this sensor.

Since synchronization of data display with a selected color filter is an important aspect of this invention, positive information to insure proper synchronization is definitely desirable. In the case of a filter kept in rotation at a constant speed, the speed and design of the filter unit could and should mathematically determine the position of the color filter elements. In practice a positive indication of timing helps to overcome induced variations which can be introduced by heat, power fluctuations, increased friction, etc.

This sensor causes an impulse to be sent to the synchronizer when a color filter segment passes it. This impulse is specific for each color. The sensor is designed and placed such that it sends the impulse in sufficient time for the synchronizer to receive and act upon it.

The synchronizer receives the impulse; identifies it as to color, and matches it with the color desired for selection. If the impulse matches the color command, the synchronizer signals for data to be displayed. If no match, no data is displayed until proper color filter is in synchronism. If no data is displayed, there is no light to expose the film.

EXAMPLES OF FILTER POSITION SENSORS:

1. A magnetic spot or spots placed on the rotating filter element which induce electrical signals in stationary coils causing signals to be sent to the synchronizer. Color can be indicated by the number of spots and coils and thus the number of signals generated. The color can also be coded by the position of the spots and coils.
2. A brush assembly similar to that on an electric generator or motor.
3. A beam of light directed through the filter to opposing photocell(s) which causes the photocell to be activated only when filtered by a specific filter. Such specific activation can be accomplished by varying the number and/or position of photocells or by a light polarization technique.

One is able to obtain selective colors by magnetic tape command. That is, since the phenomenon of color is caused by the ability of the human eye to observe light of different wave lengths, varying that wave length or deleting certain wave lengths by use of filters from reds on the high end of the spectrum to blues and violets on the low end of the spectrum results in the eye or the color film detecting a color difference. Obviously, the amount of color change that can be obtained is influenced by the type of light emanating from the CRT face. A conventional CRT (cathode ray tube) is monochromatic, that is to the eye it is of a more or less single color which is usually near the blue violet end of the spectrum. Due to the near absence of red color in this type of tube it is difficult to reproduce a true red image in the color film, thus, it is desirable, if reds, yellows and oranges are to be reproduced, to use a special cathode ray tube in which the fluorescent powders on the screen are a different composition, white phosphors being preferable, that will enable a wider spectrum of light to emanate therefrom. However, in this invention only one such phosphor need be used. The excitation of this phosphor is still from a single gun source which is a distinct advantage over the normal color TV system which uses a three gun multi phosphor method.

Of course if additional electron guns are used in the tube with or without additional phosphors, the filter synchronizer can be used in conjunction with such a system. This is again obvious to one skilled in the art.

FIG. 1 also illustrates another embodiment of this invention where the entire background form of a particular frame or a particular series of frames of color microfilm can be varied by format slide projector 38 such a projector is discussed in U.S. Pat. No. 3,161,458. In some types of equipment for example the Stromberg DatagraphiX models 4400, 4360 and 4440 made by Stromberg Carlson Division of General Dynamics Corporation, provision is made to project a form 40 in to the light path by means of a prism 24 which will normally allow the light emanating from the CRT to pass through it but will also pick up light which enters the prism from the proper angle such as light emanating from a white source 42 and directed into the prism 24 the form 40 which is placed between the light source 42 and the prism 24 can be background lines for a ledger sheet or the heading for some particular paper upon which the column of numbers on the CRT face should be reproduced, for example a statistical report form.

In conventional procedure this form flash would appear black and white and blend in with the general background of the numbers on the CRT face and be difficult to distinguish from the data itself on the black and white microfilm. In the improvement of this invention the form would be projected in color by any one of a plurality of light sources for example light bulbs 42, 44 and 46 which could be white, red and green. The light sources are activated by the use of tape commands and are housed in the format slide projector 38. Thus the image projected by means of a filtered light source or a color light source would appear as colored lines columns etc. on the completed color film.

A rotating image projection unit similar to the filter unit above could be employed to project any one of several forms onto the film. This embodiment is illustrated in FIG. 2 where a single light source 48 has a reflector 50 to project light through an interchangeable form 40 and rotating disc or wheel 26.

Since the flash of light emanated from the format slide projector can be transformed into most any color desired by either of the two methods listed above it can be recorded by the camera. By the further use of the filter in the form slide projector or by varying the light intensity of the form slide projector, the overlay may be further differentiated from other data on the film by virtue of intensity of color. Thus the equivalent of multi color half tone transparencies can be produced.

The easiest method to produce a formslide overlay in color is of course to use a color film in the original production of the slide. Another equally easy method is of course to tint a black and white film of the form overlay. However the advantage of selectively producing color in a form slide are:

1. To highlight in color certain pages or parts of pages selectively. For example to differentiate pages of summary data which appear at the end of sections of a detailed report.
2. To highlight exception data only when it appears. Thus for example an out-of-stock re-order condition could be indicated on specific items eliminating the necessity for additional data processing reports listing only those items.

The placement of colored filters or rotating filter elements may be anywhere in the light path. For convenience it is easier to construct the device such that the filters are placed before the prism 24. With such placement the synchronization of filters for the CRT and the forms flash units is less complicated. A single filter or set of filters could appear after the prism which in turn would govern the color of either light source. This approach would increase the sophistication of the filter synchronizer unit and probably slow the speed of the machine. For example presuming that data from the CRT was required to be in blue and the form overlay was desired to be in light green additional rotational delay time would be required to first project the data with a blue filter and then wait until the light green filter swung in front of the prism to flash the form overlay. With two separate filter units the CRT data display and the form flash overlay could operate more independently and therefore faster.

In order to disclose the best mode currently contemplated for carrying out this invention, as well as to describe a specific embodiment, the following example is given. It should be understood that this is by way of example only and is not a limitation on the general scope of the invention. In order to build a specific rotating disc or wheel the following data and calculation could be used.

Assume:

1. The CRT Tube face displays data in an area 3 inches × 3 inches square,
2. Each filter element will cover an entire line at a minimum.
3. Character height on tube face = 0.020 inch
4. Filter wheel radius of 6 inches
5. 60 lines per page.

To find the angle of each filter element: (see FIG. 3) First, solving for angle a, in triagle YVZ the angle is equal, therefore tan $a$ = opposite/adjacent = side $t$ – character height/radius of wheel =

(1.5–.02/(6.0) = 1.48/6.0 = 0.2466

$a$ = Arctan 0.2466 = 13.8°

Then solving for angle $b$ in triangle WVX tan $b$ = WX/VW tan $b$ = 1.5/3.0 = 0.5

$b$ = Arctan 0.5 = 26.6° c = $b$–$a$=12,8° angle of each filter segment

No. of segments/disc =360/$c$=28 approx.

Computing RPM:

Assume: Data Rate = 90,000 characters/sec.
Line length = 132 characters/line
Circumference of 6 inch wheel = 37.69 inches
Number of Filter Elements = 28 from previous calculations
Line print rate = 90,000 char/sec/132 chara/line = 683 lines/sec. or 1/683 sec/line.
For computational convenience in this example, hereinafter assume 1/600 sec/line.

Assume

Three color printing (green, blue, cyan) plus black-and-white desired; so 4 separate types of filter elements must appear on the rotating filter element eg. one for each of green, blue, and cyan and one neutral element for black-and-white. These shall be abbreviated $g, b, c, n$ in the discussion below.

Since there are 28 filter segments/rotating filter element, there can be 7 sets of 4 colors each on a filter element. A group of four filters hereinafter will be called one set or one filter-set.

To synchronize one set with data rate without buffering, the filter wheel must rotate at sufficient speed to position one set as each line of data is displayed from top to bottom on the screen. Thus both the filter set and the data line positions are advancing with respect to the light path and with respect to time.

eg. at an instant $t1$ — line 1 is displayed —
set 1 is positioned properly in front $t2$ — line 2 is displayed —
set 1 is positioned properly in front In the example rotating wheel type filter each filter segment is larger than each data line to insure covering the entire line when data is displayed. The rotation of the filter element is to be at a constant speed for convenience in calculation in this example. Thus, the constant speed selected should insure that the position of a filter element with respect to the data lines displayed remains constant. In other words the same filter element, rotating past the screen, will be in front of each line on the screen as it is displayed which will produce single color recording depending upon the color of that element. So, the filter sweeps by the tube at the same rate as each data line sweeps down the tube.

In the example — to find the rotational speed of the wheel. From FIG. 3, as the element rotates from line 1 to line 60 it makes new angles with respect to the axis. The number of degrees moved is therefore 2$b$ or 2×26.6=53.2. So, in one six-hundredths second the filter element must move one line.

Since there are 60 lines per page it takes one-tenth second per page or 532° of rotation per second.

Thus (532/360)×=88.66 RPM.

The computational example above has illustrated the filter size and rpm (based on certain assumptions) for a device naturally synchronized with data display for one color print.

To produce two or more colors of print from a given filter element configuration (geometry and placement in the light path) there are two dependent variables — specifically:

1. Rotational speed of the filter — which must be a constant
2. Data Buffer storage size.

From a given filter element geometry and placement in the light path, the production of two colors requires a variation in timing either in presentation of data on the CRT or in rotational speed of the filter to synchronize character display with the color.

The example above illustrated data display synchronized with only a single color on a multi-color filter element. To change colors the timing (synchronization) of the CRT data display must be changed to the timing of another filter segment. This can be accomplished in several ways for example:

| | |
|---|---|
| If desired color is "behind" the color | 1. Slow-down the data display rate to allow the desired color segment to "catch-up". |

| | |
|---|---|
| presently synchronized. | 2. Speed-up the filter wheel to catch-up with the data. |
| If desired color is | 3. Speed-up the data to catch-up to leading filter. |
| "ahead" of color presently synchronized. | 4. Slow down filter to allow data to meet leading filter. |

In this example and regarding the type of equipment — of the four ways to change synchronization timing, number (1) above is chosen for further illustration. The reasons for this choice are:

1. Speeding-up or slowing a moving filter wheel requires precise mechanical or electrical braking, a variable speed motor, and another component of synchronization delay time while speeds adjust.
2. This example presumes magnetic tape input which reads at a constant data rate. Thus speeding-up the data is not considered.
3. Data can be slowed-down in this example by using a buffer (temporary data storage) to hold data from the CRT. Thus, data read is stacked or queued in the buffer until the display and the filter are synchronized.

NOTE: The magnetic tape containing data codes is divided into blocks of data consisting of one or more data lines. Each data line consists of one or more data characters. A data character is any alphabetic, numeric, or special character including blanks and line vectors.

Data blocks on tape are separated by gaps or inter-record gaps (IRGs) as they are called. These gaps vary in size depending on manufacturer and model but can be considered to be 0.6 inches of tape for this example.

Data so stacked or queued, is sent to the CRT when the desired filter "catches-up" with the line to be displayed. Referring to FIG. 3, data read in has been displayed through color filter 1 which is presently synchronized. When a code commanding a color change is read and processed for the next line of data, another filter must be synchronized eg. 3. Now that data is continuously being read but should not be displayed until filter 3 catches-up with the proper display position where the second line of data is to be recorded.

To accomplish the delay needed for filter 3 to rotate to the position for the second line of data recording, data is stored in the buffer character-by-character. If the filter rotates as 88 RPM (per example), and if the synchronized filter segments moves 0.3° per line then the amount of delay time (rotational delay) is found as follows:

| | | |
|---|---|---|
| Filter 1 rotation | = | 13.8° |
| Add Filter 2 rotation | = | 13.8° |
| Add Filter 3 rotation | =.0° | |
| Total Rotation | | 27.6° |

Since the wheel is rotating 532°/sec (from previous calculations) then:

$$27.6°/532° = 0.05188 \text{ seconds delay}$$

In 0.05188 sec at 90,000 characters per second data-rate, the buffer must store 4,670 characters.

In the worst case situation where filter 1 is synchronized but filter 4 is selected, the rotation to synchronize is now 41.4° and the rotational delay is 0.0778 sec. Therefore, at 90,000 characters/sec. the buffer must store 7,004 characters.

Having filled the buffer, data is read out as soon as the synchronizer is informed that the selected filter is in synchronism. Data is read out until the buffer is empty or until another filter select command is sensed.

In either case as soon as the synchronizer causes data to enter the buffer, it also signals the tape controller to stop reading data at the next IRG. Thus, by stopping the tape at the next IRG, data input can cease long enough to empty the buffer.

Pragmatically, the buffer maximum size is limited since one page of printed data can not exceed a maximum of 132 characters/line by 76 lines per page (or frame) (assumes 16 mm film with lines across width) which is 10,032 characters. With the addition of three control codes per line this total becomes 10,260 characters. This limit in buffer size is feasible because computers which generate the magnetic tape are programmed for whatever block size is required. A maximum block size of 10,260 characters is within a computer's capabilities. A blocksize of anything less than this maximum is of course acceptable.

When the buffer is filled and being read-out, if another filter select command is sensed, again data transfer to the CRT is suspended until the new filter is synchronized.

SUMMARY

To design a specific machine depends upon several factors which are related:

1. Display surface and character size affect filter design including size.
2. Data input rate (data transfer rate) and filter design affect rotational speed.
3. Data display, input rate, filter design, and rotational speed affect buffer size.

In practice, these parameters can be varied or set initially to meet the requirements of an existing machine or of the design of a new machine.

The embodiment described is illustrative of the process only. The computations are approximate for illustration. No attempt was made to optimize for operational or production efficiency.

Briefly embodiment was

1. Given the following fixed parameters
   a. Display Surface = 3×3 square CRT face
   b. Character Height = 0.02 inch
   c. Data Characters per Line = 132 max
   d. Data Lines per frame = 6 (for character area calculations)
   e. Control Codes = 3 (2 at beginning and 1 at end of each data line)
   f. Input Data Transfer Rate = 90,000 characters/second.
2. Assuming the following design goals:
   a. A rotating filter unit in the form of a wheel
   b. Multiple filter elements on that wheel which contain several repetitions of the desired colors so as to reduce rotational delay effects.
   c. Simple synchronization example for illustration.
   d. Synchronization based on storing data in the buffer until the selected filter element is in the proper position.
   e. Filter elements cover an entire data line.
   f. Limitation of maximum buffer storage to one frame of data which including control codes is 10,260 characters (135 characters/line × 76 lines/page)
   g. Ability to stop the data input at an IRG to permit printing data stored in the buffer during waits for synchronization.
   h. Filter rotation maintained at a constant speed.
3. The following variables were calculated based on these given factors:
   a. Size of Rotating Filter Wheel = 6 inch radius
   b. No. of Filter Segments/Wheel = 28
   c. Size of each Filter Segment = 12.8°
   d. RPM of Wheel 88.66
   e. Rotational Delay = 0.0259 seconds/segment From the example it is obvious that by increasing the speed in RPM of the filter wheel by a proper (calculatable) factor the delay time could be significantly reduced. In this embodiment such an increase would be definitely desirable since it will tend to increase the throughput of the machine.

An increase in filter rotation speed will affect the filter sensor (described above). The type, design, and placement of this sensor must compensate for the inherent delay in sensor activation commensurate with the speed of rotation. For example if a magnetic area on the wheel is used to produce an induced voltage in an adjacent, fixed coil (which comprises an Induction sensor), the coil must be located sufficiently ahead of the moving filter to allow required induction voltage build-up, signal tansmission, and action in the filter synchronizer unit. Otherwise by the time the signal reaches the synchronizer and is acted-upon, the filter could have moved too far.

An increase in filter rotation speed can also permit a reduction in necessary buffer storage size for maximum throughput. The faster it gets, the lower the rotational delay. Reducing the rotational delay tends to reduce the amount of data which must be queued in the waiting line. Thus, the capacity of the waiting line (buffer storage) can be reduced.

Although a preferred embodiment of this invention has been illustrated and described herein in order to set forth the best mode presently contemplated for carrying out this invention, it should be understood that it is not limitative hereof and the scope of the protection sought is defined by the following claims.

It is also contemplated that this invention is similarly applicable to other recording sources such as lasers or electron beams. In such cases the selection of filter elements is a more critical factor and this invention is not restricted to usual filter material such as gelatin or glass which could be damaged by laser light.

What is claimed is:

1. In a computer output microfilm apparatus for converting data stored on magnetic tape to data stored on photographic film said apparatus including magnetic tape and means for moving that tape through a tape reading unit which converts data stored on the tape into electrical signals, a cathode ray tube activated by said signals and camera means positioned to photograph the face of said cathode ray tube, the improvement comprising:

a color oriented photography device having means for sensing a color command signal on said tape, at least one rotating color filter unit positioned to inject at least one color filter into the light path of the cathode ray tube between it and the camera means, electronic synchronization means connected to said color filter unit and said cathode ray tube, means connecting said color command sensing means to said synchronization means so that the synchronization means will cause the cathode ray tube to display a given piece of data at the same time that the color unit is interposing into the light path the particular color designated by the color command associated with that given piece of data.

2. The apparatus of claim 1 including a buffer storage unit to hold the data produced by said tape reading unit until after the desired filter color is rotated by said filter unit.

3. The apparatus of claim 1, wherein said rotating color filter unit is a wheel having multiple color filter segments arranged thereon with said wheel rotating at a speed which is synchronized electrically with the input from said magnetic tape.

4. The apparatus of claim 3, wherein the rotating wheel segments are defined by radius lines of a circle, each segment being of sufficient width to cover approximately one line on said cathode ray tube.

5. The apparatus of claim 3, wherein the rotating wheel has sensor means associated therewith to feed a signal to said synchronization means.

6. The apparatus of claim 5, wherein said sensor means comprises a magnetized area associated with at least one of said color filter segments and means to detect said magnetized area.

7. The apparatus of claim 5, wherein said sensor means comprises an energy radiating source on one side of said wheel, an energy sensitive receiver on the other side of said wheel and energy control means rotating with said wheel to control the energy reaching said receiver.

8. The method of producing color oriented photography from a magnetic medium comprising the steps of:

a. Placing a color command signal on a magnetic data storage medium;
b. Sensing said color command signal;
c. Sensing the data stored on said medium and storing said data in a temporary electronic storage device for later visible display on a display device;
d. Rotating a multiple color filter unit before said display device;
e. Sensing a specific color filter as it is rotated before said display device corresponding to the color command signals sensed;
f. Causing the data in temporary storage to be read out at the proper time in black and white on said display;
g. Photographing at least a portion of said black and white display in color through said color filter.

9. In a data conversion apparatus for converting data stored on magnetic medium to data stored on photographic film, said apparatus having a magnetic medium and transport mechanism therefor, means for converting data stored on said magnetic medium into electrical signals, a display device actuated by said signals, means to photograph said display, and format projector means to superimpose a selected format onto a given section of film, the improvement comprising:

a device for superimposing said format in color comprising at least one overlay positioned in the light path of said projector, means to selectively actuate said projector when a predetermined item is displayed, a plurality of color light sources operatively positioned in said projector, and means to selectively actuate at least one said color light source to produce a display from said projector.

10. In a data conversion apparatus for converting data stored on magnetic medium to data stored on photographic film, said apparatus having a magnetic medium and transport mechanism therefor, means for converting data stored on said magnetic medium into electrical signals, a display device actuated by said signals, means to photograph said display, and format projector means to superimpose a selected format onto a given section of film, the improvement comprising:

a device for superimposing said format in color comprising at least one overlay positioned in the light path of said projector, means to selectively actuate said projector when a predetermined item is displayed, at least one rotating color filter unit positioned to inject at least one color filter into the light path of said projector.

11. The apparatus of claim 10, wherein said rotating color filter unit is a wheel having multiple color filter segments arranged thereon with said wheel rotating at a speed which is synchronized electrically with the input from said magnetic medium.

12. The apparatus of claim 11, wherein the rotating wheel segments are defined by radius lines of a circle.

13. The apparatus of claim 11, wherein the rotating wheel has sensor means associated therewith to indicate which color filter segment is in said light path.

14. The apparatus of claim 13, wherein said sensor means comprises a magnetized area associated with at least one of said color filter segments and means to detect said magnetized area.

15. The apparatus of claim 13, wherein said sensor means comprises an energy radiating source on one side of said wheel, an energy sensitive receiver on the other side of said wheel and energy control means rotating with said wheel to control the energy reaching said receiver.

* * * * *